United States Patent
Barrett et al.

(10) Patent No.: US 6,611,876 B1
(45) Date of Patent: Aug. 26, 2003

(54) METHOD FOR ESTABLISHING OPTIMAL INTERMEDIATE CACHING POINTS BY GROUPING PROGRAM ELEMENTS IN A SOFTWARE SYSTEM

(75) Inventors: Robert C. Barrett, Sunnyvale, CA (US); Thomas Alexander Bellwood, Austin, TX (US); Rabindranath Dutta, Austin, TX (US); Christian Lita, Austin, TX (US); Matthew Francis Rutkowski, Pflugerville, TX (US); Merle Douglas Sterling, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,397

(22) Filed: Oct. 28, 1999

(51) Int. Cl.[7] ........................... G06F 13/00; G06F 15/16
(52) U.S. Cl. ..................... 709/246; 709/200; 709/203; 709/217; 709/223; 709/247; 711/118
(58) Field of Search .............................. 709/200–253; 711/118–131

(56) References Cited

U.S. PATENT DOCUMENTS

| | | | | |
|---|---|---|---|---|
| 5,861,906 A | * | 1/1999 | Dunn et al. | 348/7 |
| 5,864,854 A | * | 1/1999 | Boyle | 707/10 |
| 5,918,013 A | * | 6/1999 | Mighdoll et al. | 395/200.47 |
| 5,935,207 A | * | 8/1999 | Logue et al. | 709/219 |
| 6,182,072 B1 | * | 1/2001 | Leak et al. | 707/10 |
| 6,185,608 B1 | * | 2/2001 | Hon et al. | 709/216 |
| 6,226,642 B1 | * | 5/2001 | Beranek et al. | 707/10 |
| 6,401,132 B1 | * | 6/2002 | Bellwood et al. | 709/246 |
| 6,421,733 B1 | * | 7/2002 | Tso et al. | 709/246 |

OTHER PUBLICATIONS

Barrett, R., Maglio, P. P., & Kellem, D. C. (1997). A confederation of agents that personalize the web. In Proceedings of the First International Conference on Autonomous Agents, Marina Del Rey, CA.*

Barrett, R., Maglio, P. P., & Kellem, D. C. (1997). How to personalize the web . In Proceedings of the ACM Conference on Human Factors in Computing Systems (CHI '97), Atlanta, GA.*

Barrett, R. & Maglio, P. P. (1998). Intermediaries: New places for producing and manipulating web content . In Proceedings of the Seventh International World Wide Web Conference (WWW7), Brisbane, Australia.*

Maglio, P. P. & Barrett, R. (1997). How to build modeling agents to support web searchers. In Proceedings of the Sixth International Conference on User Modeling, Sardinia, Italy.*

Underwood, G. M., Maglio, P. P. & Barrett, R. (1998). User centered push for timely information delivery. In Proceedings of the Seventh International World Wide Web Conference (WWW7), Brisbane, Australia.*

* cited by examiner

Primary Examiner—David Wiley
Assistant Examiner—Alina Boutah
(74) Attorney, Agent, or Firm—Duke W. Yee; Marilyn Smith Dawkins; Michael R. Nichols

(57) ABSTRACT

A set of program elements (e.g., transcoders) are grouped together as an administrative unit. Instead of caching the individual outputs of each program element, preferably only the aggregate output of the set of program elements, taken as a whole, is cached. The inventive technique enables the effective re-use of intermediate content. In an illustrative client-server based implementation involving a transcoding service located at a server, the cached information may be shared across multiple server instances to obviate redundant processing. With the present invention, a caching mechanism in a complex software system may be extended in a user-configurable manner by setting up optimal intermediate caching points that are defined by groups of programs used in long computations.

24 Claims, 5 Drawing Sheets

METHOD FOR ESTABLISHING OPTIMAL INTERMEDIATE CACHING POINTS BY GROUPING PROGRAM ELEMENTS IN A SOFTWARE SYSTEM

BACKGROUND OF THE INVENTION

1. Technical Field

The present invention relates generally to data management in a complex computer system and, in particular, to a method of reusing software elements in such a system to facilitate efficient intermediate data caching.

2. Description of the Related Art

Intermediaries are computational entities that can be positioned anywhere along a data stream, e.g., an HTTP stream, and are programmed to tailor, customize, personalize, or otherwise distill or enhance data as it flows along the stream. A caching web proxy is a simple example of an HTTP intermediary. Intermediary-based programming is particularly useful for adding functionality to a system when the data producer (e.g., a server or database) or the data consumer (e.g., a browser) cannot be modified.

A known intermediary architecture and framework, called Web Intermediaries (or WBI, pronounced "webby"), is useful for creating intermediary applications on the web. Basically, WBI is a programmable web proxy and web server that, together with a web development kit, may be used with Java APIs for building web intermediary applications within the WBI framework. Examples of intermediary applications include: transcoding content between formats, personalization, password and privacy management, interactivity, and content filtering. WBI is just one example of an architecture for managing web intermediaries. Other conceptual techniques include, for example, chaining of Java-based servlets.

Transcoding is the process by which a data object in one representation is converted into another representation. Typical examples include conversion within media types (e.g., an image encoded in one standard is transcoded into an image encoded in a second standard), as well as conversion between media types (e.g., speech to text). A transcoder is a functional module, typically in the form of a piece of computer code, that accepts a data stream as input and produces a data stream as output. The output stream is created based on the transcoder's input stream and the function that the transcoder is designed to perform. A set of "n" transcoders may be chained or otherwise grouped together to form a transcoder proxy framework. In a given transcoder, the transcoding function could be one of any number of operations such as: a request modifier, a content editor, a content generator, or the like. A given transcoder output stream may also be based upon an original or modified request, histographical information on transcoding paths already taken, and/or external preferences (e.g., network connection speed, client device capabilities, user preferences, and the like) established in a separate database.

The WBI backbone provides a well-defined interface, known as a sublayer, for receiving requests and generating responses. In a server supporting the WBI framework, there may exist multiple sublayers, each accepting requests from a different source (e.g., a proxy listening on a port, a serial port, a servlet, and the like) and handling a specific protocol (e.g., HTTP, FTP, POP3, and the like). A sublayer is responsible for instructing the WBI backbone on how to process a request by providing a set of rules that describe how to generate a response. The backbone provides a rules engine (RE) that uses the rules provided to map a request to a set of plug-ins that then perform the actual content transcoding. In generating a response to a given request, a number of intermediate steps (plug-ins) also may be executed.

It is desirable to re-use the output of these intermediate steps, because many requests (from different clients) will likely contain steps in common and, because the overhead of regenerating like output can be avoided by providing a caching mechanism. Likewise, a given client may make a request for the same resource that was requested in the recent past. For example, assume a user logs in to his account to check the status of an online order. If the order status has not changed, it should not be necessary to regenerate the status page to be returned. The page should have been cached, with the lifetime of the page being controlled by cache expiration policies.

One of the main problems in caching of intermediate data, however, is the appropriate granularity of caching. If the number of intermediate points in execution at which the data is cached is not properly balanced with the time taken to produce and save the intermediate data, then intermediate caching is counterproductive to system performance.

The present invention addresses the problem of how to effectively perform intermediate caching in a complex software system such as the type described above.

BRIEF SUMMARY OF THE INVENTION

According to the present invention, a set of program elements (e.g., transcoders) are grouped together and, for caching purposes, are administered as a unit. Instead of caching the individual outputs of each program element, preferably only the aggregate output of the set of program elements, taken as a whole, is cached. The inventive technique enables the effective re-use of the program elements and the intermediate content produced thereby. In an illustrative client-server based implementation, e.g., a transcoding proxy located at a server, the cached information may be shared across multiple server instances to obviate redundant processing of client requests.

Thus, it is a specific object of the present invention to group program elements together in a complex software system by caching an aggregate output so that computations are not repeated when unnecessary and excessive caching is avoided. It is a particular object of the invention to provide such a caching mechanism in the domain of transcoding data from the Web.

It is another primary object of the present invention to provide a mechanism for grouping a set of related transcoders together for caching purposes. As an illustrative example, a group of related transcoders are a set of software routines that transcode images from a given image format (e.g., gif) to one or more other image formats (e.g., .png, .jpeg, or the like). Another example of a group of related transcoders includes transcoders that convert data from one format to another data format. Thus, for purposes of intermediate caching according to the present invention, the individual transcoders in a group may have a given relationship to one another.

In a particular embodiment, a set of transcoders that are operative in a transcoding framework and that share a set of preference categories (e.g., given network, user or device preferences) are grouped together to decrease the frequency of intermediate caching in the framework. Thus, instead of caching the output of every transcoder, only the group output is cached.

According to another feature of the present invention, a group of related transcoders preferably is defined by a system administrator. By enabling administrator control over the granularity of intermediate caching, overall system performance is spread over many client requests and is thus maximized.

With the present invention, a caching mechanism in a complex software system may be extended in a user-configurable manner by setting up optimal intermediate caching points that are defined by groups of programs used in long computations, thereby balancing space and time resources in the system.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 4b is a block diagram of a WBI transaction session sublayer for use in conjunction with the client session sublayer of FIG. 4a;

DETAILED DESCRIPTION OF THE PREFERRED EMBODIMENT

Figure 1:
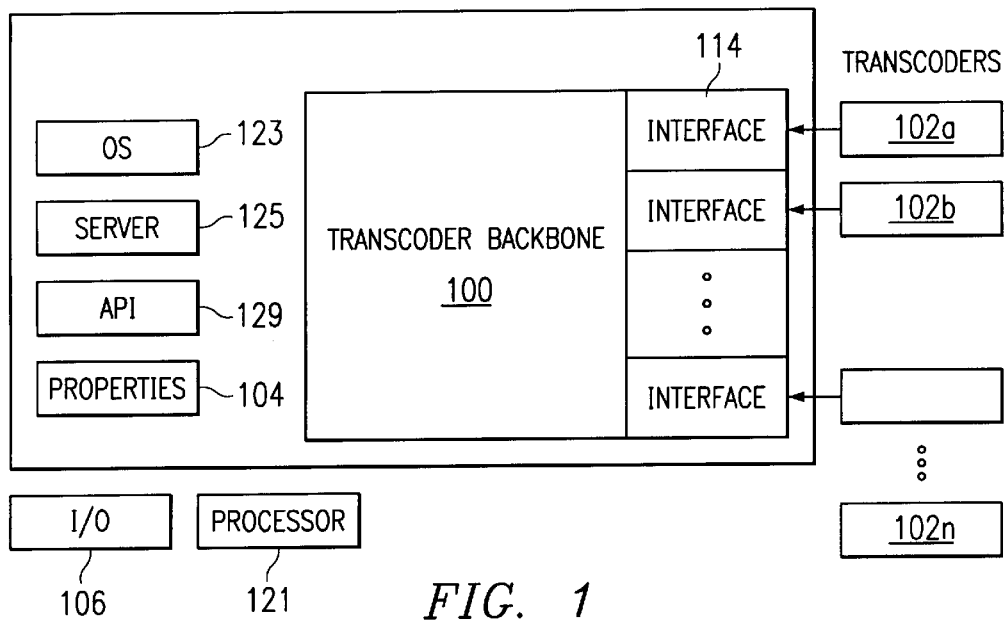
FIG. 1 is a block diagram illustrating a transcoding backbone for use in registering, loading, initializing and managing a set of transcoders.

By way of brief background, and with reference to FIG. 1, the present invention may be implemented in a transcoding backbone 100 into which individual transcoders 102a–102n are installed and managed. A known transcoding backbone is WeB Intermediaries ("WBI" or webby). A given transcoder in WBI is sometimes referred to as a MEG, which identifies the particular function (e.g., request Modifier, content Editor, content Generator) that the transcoder performs. Typically, a transcoder comprises a set of software routines. The transcoding backbone 100 may be implemented in any number of convenient ways, such as a standalone proxy server, as a managed Java servlet under a web server application (e.g., IBM WebSphere) that registers for all requests, as a callable service (via a direct API), or as an Enterprise Java Bean (EJB) callable from any server-side application. While the following description is made in the context of a WBI-based transcoding backbone, this is not a limitation of the present invention. The concepts described below are separable and may be implemented in other servlet-based environment or otherwise coded directly into a server program or as a plug-in to such a program.

Referring back to FIG. 1, a given transcoder 102 is registered with the backbone by an administrator either statically (e.g., in a properties file 104) or dynamically (via a console 106 at the server). Alternatively, the transcoder may be registered via a remote Java-based GUI. Once registered, one or more transcoders are loaded when the backbone is initialized (e.g., started from a command line, initializing a servlet wrapper, or the like, depending on the backbone configuration). After the individual transcoders are loaded, the backbone 100 may query the transcoders via interfaces 114.

Figure 2:
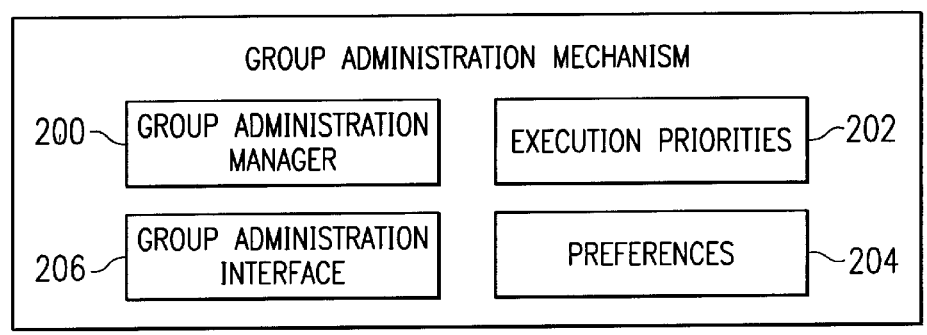
FIG. 2 is a simplified block diagram of a group administration mechanism of the present invention.

Intermediate caching of data in the WBI framework is desirable if such caching can be appropriately balanced with the time taken to produce and save the intermediate data. The present invention solves this problem by associating sets of MEGs into one or more MEG (or transcoder) groups. Instead of caching the outputs of each MEG in a given group, only the final output is cached. FIG. 2 illustrates a preferred mechanism for use in providing this group functionality according to the invention.

In particular, a group administration manager 200 is responsible for grouping together of MEGs into MEG groups. A set of MEG groups may be executed according to a set of execution priorities stored in the database 202. Further, a given MEG also may have associated therewith a number of dependencies, e.g., what network preferences the MEG is dependent on, what user preferences the MEG is dependent on, what device preferences the MEG is dependent on, and so forth. Representative network preferences, for example, include supported and unsupported extensions, images, compression source, and the like. Representative user preferences include a text vs. image link preference, a type of desired source compression, how images are disposed, preferred image scaling factors, or the like. Representative device preferences include supported and unsupported formats, device types, desired content types, and the like. These dependencies are stored, preferably as (key, value) pairs, in a database 204.

A plug-in writer, if he or she chooses to take advantage of the inventive caching techniques, may provide the preference information when the MEG is authored. The administrator who installs the MEG then uses an interface 206 of the group administration manager 200 to assign the MEG to a given group, to identify whether or not the output of a particular group should be cached, to define the execution order of the MEGs within a given group, to define the execution order of the MEG groups, and so forth. The interface 206 may also be used to create new groups, to alter or modify the preferences of a given MEG, and the like. The interface 206 may be a graphical user interface (GUI), a command line interface, or any other convenient implementation. A representative GUI implementation is described in more detail below.

In the preferred embodiment of the invention, MEGs that have related functionality are grouped together in a MEG group. In this way, program elements within the software system are made easily reusable. Thus, for example, a given set of related MEGs may be those plug-ins that change one image format to another, e.g., .gif to .png or .jpeg, those plug-ins that change one data type to another, e.g., AFP (Advanced Function Printing Language) to SVG (Scalable Vector Graphics, a W3C standard XML 2D graphics language), Postscript to HTML, or other such convenient relationships. Related MEGs may be those that convert data types without regard to device, user or network preferences, or those that convert one markup language to another. A group may comprise MEGs that share preference categories, given preferences, or the like. Still another type of MEG group may be various MEGs involved in creating a document object model (DOM) representation of given content within the W3C DOM guidelines. Of course, the present invention is not limited to any particular type of relationship with respect to a given MEG group. Referring back to FIG. 2, to support the MEG group functionality, a MEG typically provides given information to the group administration manager via the following methods:

(a) String getgroup( )—get logical group name MEG belongs in;

(b) String[ ] getDependencies( )—get logical names of categories this MEG is dependent upon; and (c) boolean isNeverCached( )—possible placeholder to optimize owning group's ability to cache.

The following methods are then provided to the Execution Processor in the transcoding service:

(a) Enumeration enumerateGroups( );

(b) String [ ] getDependenciesForGroup( )—creates union of all dependencies MEGs in group have returned;

(c) ExecuteMEGLoop (Group, RequestObject)

Whenever Enumeration appears, it may be an object that wrappers or implements its own Enumeration. In addition, when the group functionality is used, the administrator should ensure that the first group that is selected produces a response (i.e., generates an output). This is a default requirement.

Further, to implement this functionality, a registerAdmin (Admin) method in the transcoding service is added to the Proxy class to receive notification of administrative information. The caching and session management implementation of Run.java (described below) creates Proxy loading plug-ins (but not sublayers) from property files. Then, a sublayer is created (which also administers Admin), and this sublayer is registered as an administrator to the WBI backbone and as a sublayer to the Proxy. The sublayer receives notification of MEG registrations and passes the information to an Execution Processor to make appropriate groupings using the methods set forth above. Upon being queried, the group administration manager returns an enumeration object, namely, enumerateReverseOrderedGroups( ), wherein the last group to execute is the first in the list.

Thus, according to one embodiment of the present invention, group priorities are preferably administrator-defined and MEGs are called during initialization at their getGroup( ) interface method to get the logical group name for the group to which they belong. By using the hasMoreElements( ) method and the nextElement( ) method, the groups can be obtained.

Alternatively, one of ordinary skill in the art will appreciate that the MEGs may be called into their groups in a dynamic fashion by the group administration mechanism. In particular, a given MEG group may be defined and generated "on-the-fly" (i.e., dynamically) as the transcoding service adapts to different operating conditions.

Figure 3:
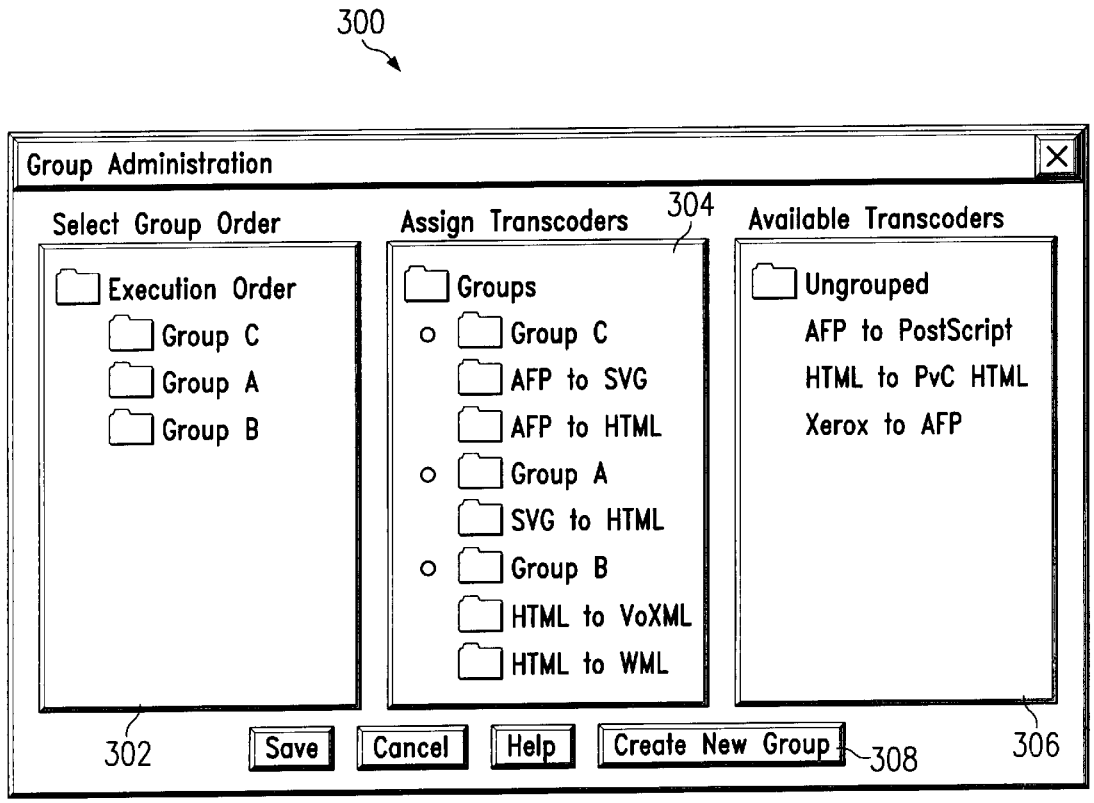
FIG. 3 is a representative graphical user interface dialog for use in enabling a system administrator to assign given transcoders to one or more groups according to the present invention.

FIG. 3 illustrates a representative GUI interface that may be used to implement the group administration functionality of the present invention. The illustrative display panel is a group administration panel 300 that includes a Select Group Order display field 302, an Assign Transcoders display field 304, and an Available Transcoders field 306. Using a conventional drag-and-drop mechanism (or any other convenient user I/O technique), the administrator assigns available transcoders to groups and orders the groups for execution. As noted above, the assignment of transcoders into group(s) may be done dynamically as well. In the illustrative example, Group C is positioned for execution before Groups A and B. Group C includes transcoders that convert without regard to device/user/network preference from AFP to either HTML or SVG. Group A has only a single transcoder that converts from SVG to HTML. Group B takes into account device/network/user preferences and reduces HTML to WML, and HTML to VoxML (Voice Markup Language, another XML standard). The available transcoders (marked as Ungrouped) include an AFP to Postscript transcoder, an HTML to PvC HTML (for pervasive computing devices that cannot handle full HTML functionality), and a Xerox to AFP transcoder. Of course, all of the above transcoder functions, as well as their representative groupings are merely illustrative. The group administration function of the invention is not limited to use with any particular transcoding function(s) or to any particular MEG groups or group constituents.

The user dialog also includes a Create New Group button 308. Selection of this button opens up a dialog (not shown) that includes a list of the available transcoders. From this list, the administrator can create a custom group and then save the results. By selecting a given transcoder (e.g., from the group dialog 300 of FIG. 3 or from the Create New Group dialog) the administrative interface opens up a transcoder dialog (not shown) from which the administrator may define given characteristics of the transcoder, modify network, user or device dependencies, and the like.

According to the present invention, intermediate caching of group output data is used to facilitate reuse of MEGs in a server that includes a transcoder service. An illustrative WBI framework that utilizes the present invention is now described.

Figure 4A:
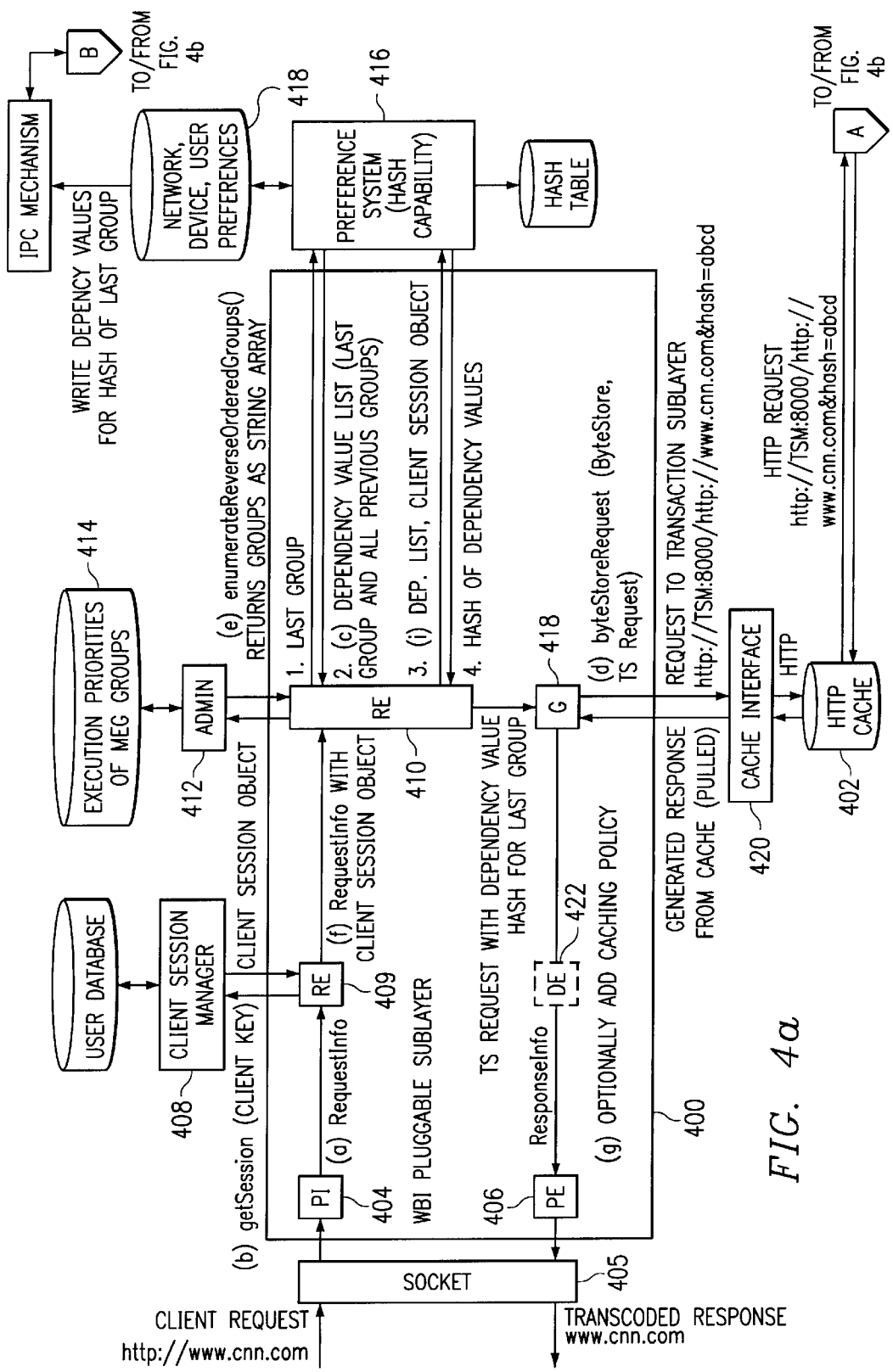
FIG. 4a is a block diagram of a WBI client session sublayer in which the present invention may be implemented.
Figure 4B:
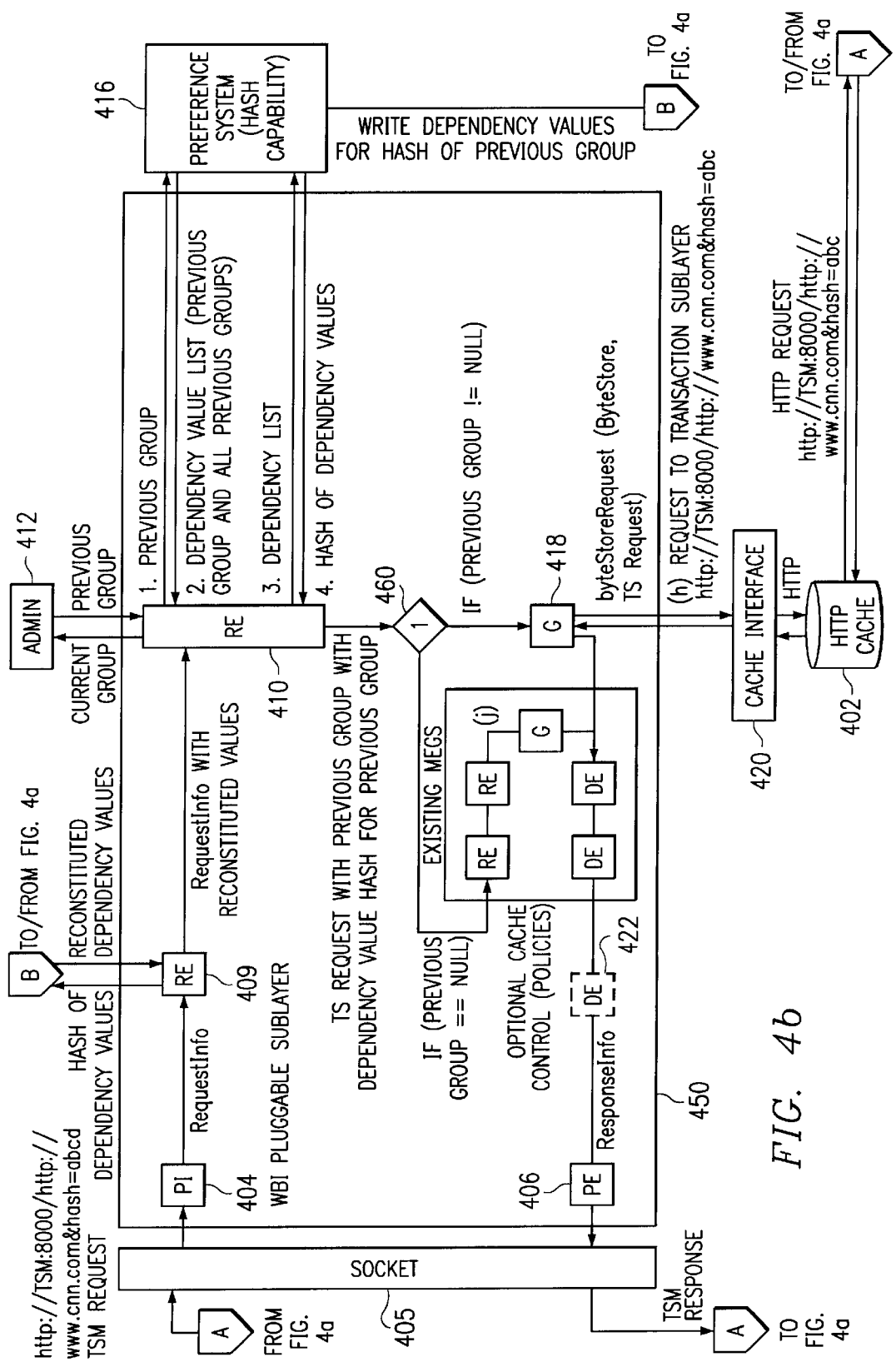

FIGS. 4a–4b illustrate a transcoding service that is operative, for example, at a web server. This service provides client session management and caching within the context of a WBI-based backbone. To this end, two specialized sublayers, referred to as a client session sublayer and the transcoding session sublayer, respectively, are utilized. Generalizing, a sublayer listens on one or more ports for incoming requests from a client (such as a browser) and propagates the request through the backbone and registered plug-ins that produce a response to be returned to the client. As will be seen, a given sublayer utilizes a caching proxy to cache both intermediate transcoding steps as well as final output so that it is not necessary to regenerate output each time a request for a given resource is received. The group caching techniques of the present invention are used for this purpose.

The client session sublayer 400, which is illustrated in FIG. 4a, is responsible for identifying client sessions. Client sessions may be identified, for example, using cookies or some other implementation. The transcoding session sublayer 450, which is illustrated in FIG. 4b, is responsible for caching both intermediate transcoding steps and final output. Preferably, an existing caching proxy 402 is used for this functionality, as there are many such proxies readily available. As is well known, a caching proxy works via a pull mechanism. In particular, a resource is requested from the cache and, if available, it is returned; otherwise, the cache fetches the resource itself and then returns it to the client. This behavior requires that all requests for a resource be made through the cache.

In a preferred WBI environment such as illustrated in FIGS. 4a–4b, a URL rewriting scheme is employed in response to a given client request. According to the technique, when an original request URL is received at the client session sublayer 400, this URL is modified such that it points to the transcoding session sublayer 450. The rewritten URL encodes the original URL as well as all of the transcoders (i.e., MEGs) that must be run to satisfy the request. The client session sublayer 400 then requests this rewritten URL through the cache 402 (a proxified request), and upon a cache miss (e.g., the first time the resource is requested), the transcoding session sublayer 450 invokes the proper MEGs to generate the response. Because the request was made through the cache 402, the response generated by the transcoding session sublayer 450 gets cached and is returned directly by the cache for all subsequent requests for that same resource (subject to cache expiration policies).

The client session sublayer 400 and transcoding session sublayer 450 work in concert to perform content transcoding via the WBI backbone and to cache the output of the transcoding for re-use on subsequent requests. Preferably, both the client session sublayer and the transcoding session sublayer use the HTTP protocol.

Figure 4A:
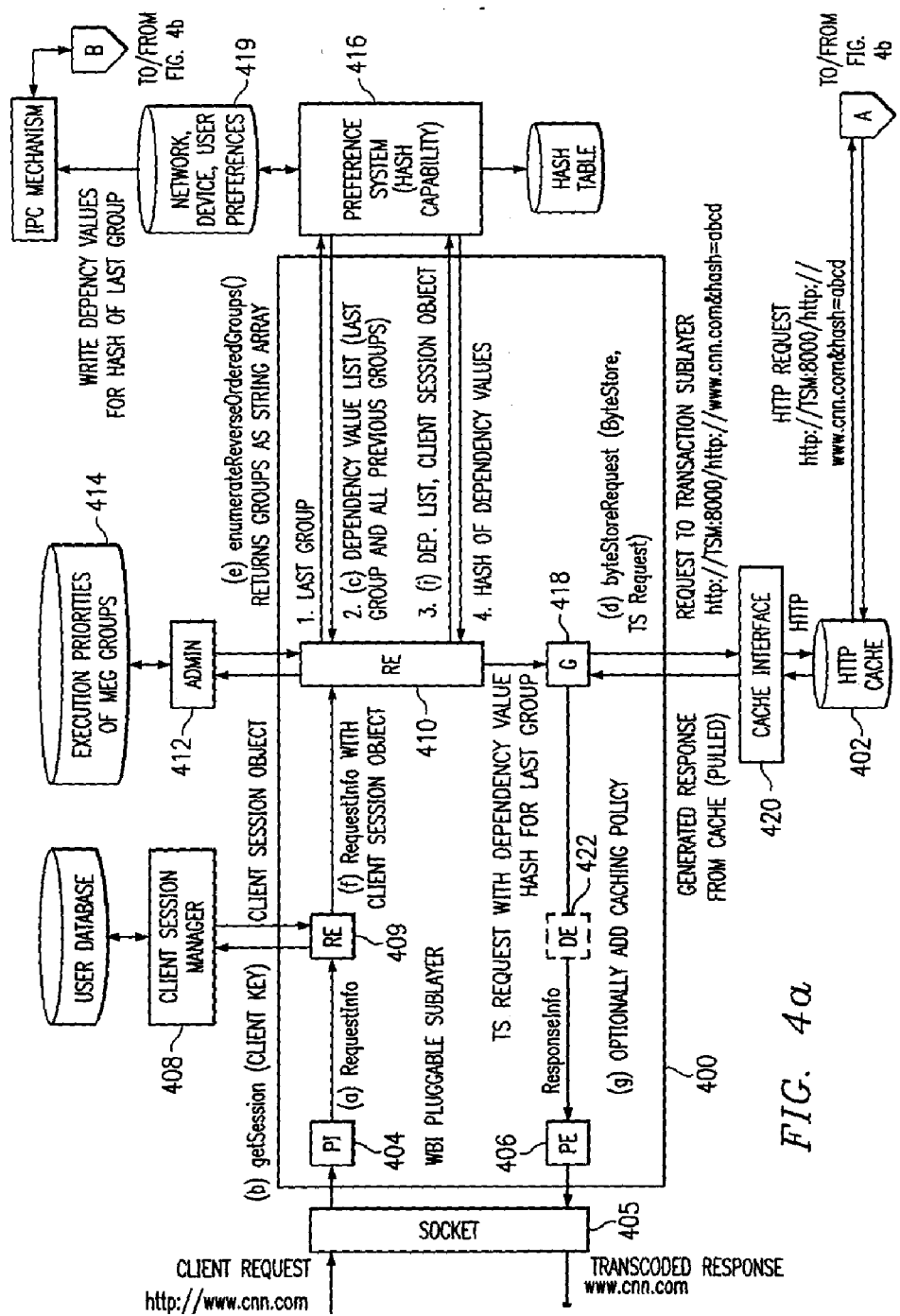
Figure 6:
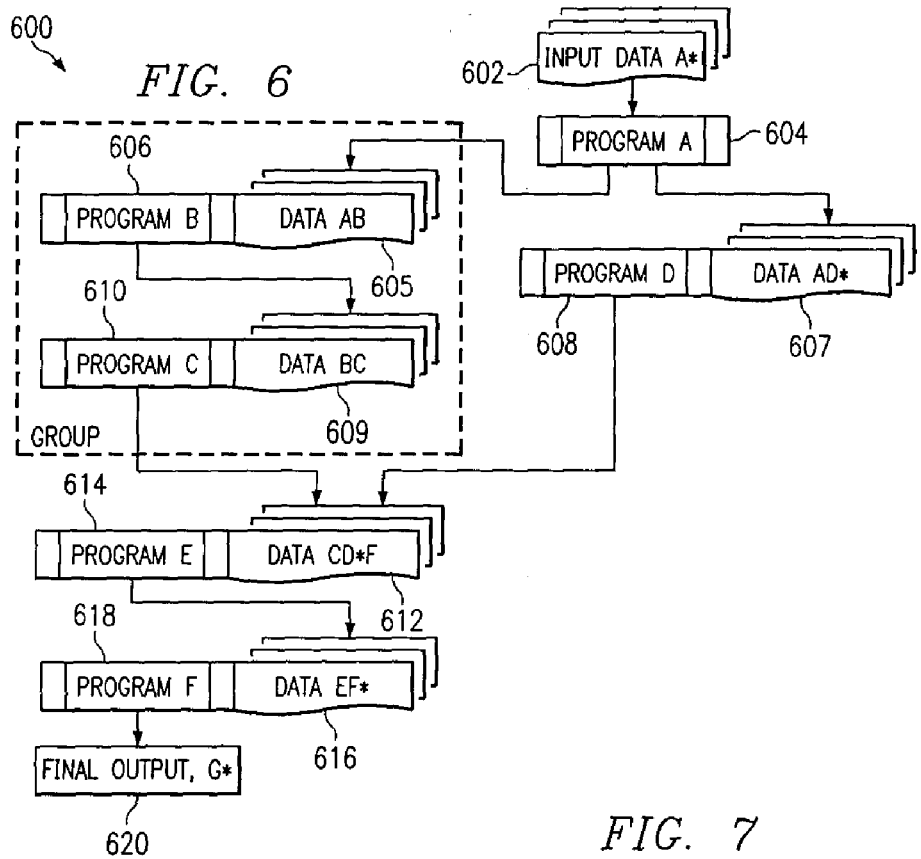
Figure 7:
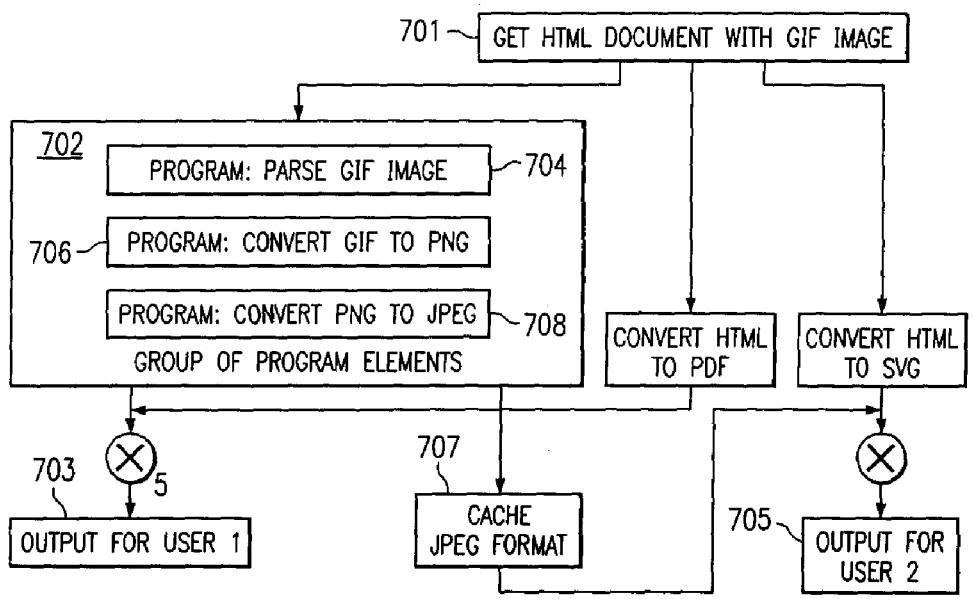

Referring now to FIG. 4, the Client Session Sublayer 400 includes a Protocol Interpreter 404 at its input and a Protocol Encoder 406 at its output. The Protocol Interpreter 404 listens on a dedicated port for HTTP requests from clients and works with a Session Manager 408 to create and/or identify existing client sessions. Annotation (a) in the figure indicates that the Protocol Interpreter provides a client key if it is provided as part of the protocol. A default session is used if no session key is provided. The client session sublayer also includes a pair of rule engines (REs) 409 and 410. The sublayer propagates requests through the WBI backbone through a registered RequestInterpreter.

When a request is received by the sublayer, it creates RequestHandle and ResponseHandle objects. The RequestHandle encapsulates the InputStream from the socket 405 that was created when the sublayer accepted the connection (serverSocket.accept( )) and the ProtocolInterpreter. The ResponseHandle encapsulates the OutputStream of the socket and the ProtocolEncoder. The backbone uses the Protocol Interpreter 402 to 'interpret' the request InputStream into a form usable by the registered MEGs. If the Protocol Interpreter 402 finds a cookie or other session identifer in the InputStream, it asks the Session Manager 408 to return a Session Object that represents that client session. Annotation (b) in the figure indicates that the client key may be derived from a cookie implementation. Annotation (f) indicates that the Session Object is added to the request specific data maintained by the RequestHandle object. Once an existing session, if any, is identified, the Client Session Sublayer queries the Group Administration Manager 412 and its associated database 414 of group execution priorities.

As described above, group priorities preferably are administrator-defined. As reflected by annotation (e), Given MEGs are called during initialization at their GetGroup( ) interface method to get a logical group name to which they belong. The Group Administration Manager 412 returns the MEG groups, preferably in reverse order; i.e., the first group returned preferably is the last group to be executed. For each group returned, the Client Session Sublayer queries a Preference System 416 and its associated database 419 for a list of dependencies (preference values).

These dependencies which, as described above, are preferably (key, value) pairs, are then compressed into a single string by the Preference System 416. Annotation (c) in the figure indicates that preference keys are usually homogenous across all server instances. These dependencies preferably are the union of all dependencies of the individual MEGs within the group to which the MEGs belong. In an representative embodiment, these dependencies are retrieved from the Preference System via the getDependencies( ) interface method. Annotation (i) in the figure indicates an optional test of the client Session Object at the point indicated.

Once all of the groups and their dependencies are obtained, a URL rewrite is performed by Generator 418. The new URL generated includes the original request, the MEG groups and their dependencies, and a cookie (or other session identifier) if one was obtained from the Session Manager 408. This new URL is then requested from the transcoding session sublayer 450 (in FIG. 4b) via a cache interface 420. Annotation (d) indicates that Generator 418 preferably uses an abstract class, such as ByteStore, to allow for sliding window buffering and other features.

As an illustrated example, the new URL may be of the following form:

GET http://TSS:8000/www.cnn.com/group1/ compressed_data1/ group2/compressed_data2.

If the resource represented by this URL is currently in the cache 402, the resource is returned directly from the cache and passed to the ProtocolEncoder 406 to be encoded and returned to the client via the OutputStream contained in the ResponseHandle. If the resource is currently not cached, however, the cache 402 forwards the request to the Transcoding Session Sublayer 450. As will be seen, the Sublayer 450 then propagates the request through the backbone to generate the proper response.

When a request is finally complete and returned from the Transcoding Session Sublayer, the response may have a cookie that must be stored. In such case, the Client Session Sublayer 400 passes the cookie to the Session Manager 408 so that this client may be joined into a session. Subsequent requests by the same client would then be recognized by the Session Manager 408 as described above.

In FIG. 4, the Client Session Sublayer includes another editor transcoder 422. As indicated by annotation (g), the transcoder may be used to implement and administer an optional client caching policy that is different from an origin server caching policy. The client caching policy may be set up by an administrator. This allows for retranscoding on a given time granularity that is controlled at the transcoding proxy level. Referring now to FIG. 4b, the Transcoding Session Sublayer 450 listens on a dedicated port for requests from the Client Session Sublayer 400. As noted above, the function of the Transcoding Session Sublayer 450 is to actually propagate the request through the WBI backbone to achieve the desired transcoding. The Transcoding Session Sublayer shares many of the components of the Client Session Sublayer, as can be seen.

Given the input request of the form set forth above, the Transcoding Session Sublayer 450 determines that the URL contains more than one group name. Therefore, the Sublayer first builds a new URL, preferably by removing the last group name and data. The resulting URL is: GET http:// TSS:8000/www.cnn.com/group1/compressed_data1. The Sublayer then requests this new URL through the cache interface. As long as there is a cache miss, the Transcoding Session Sublayer recursively requests URLs in this manner through the cache 402. In the case where this is the first request for this particular set of MEG groups, no cache hits will occur. Thus, as soon as the Sublayer notices that the URL contains only a single MEG group/data pair, it sends the request into the backbone to generate the content. Because the request was originally made through the cache interface 402, however, the OutputStream finally returned by this last MEG group gets cached. It is available as input for the prior MEG group. As the chain unwinds, each intermediate transcoding step (i.e., the output of a given MEG group) gets cached and thus is available should subsequent requests require that same output. As indicated by annotation (h), this step is a recursive request to the Transaction Sublayer that still pulls through the cache and either comes to prev=null and unwinds or gets an intermediate result from cache and unwinds from that point. As indicated by annotation (j), if generators retrieve origin data via HTTP, they should do so through the cache interface so that original (i.e., untranscoded) resources are cached as well. In FIG. 4b, the diamond "1" represented by reference numeral 460 is a decision point that determines the subsequent path through the system. When the final output has been generated, the ProtocolEncoder can be invoked to return a result to the requester. As described above, the requester in this case was actually the Client Session Sublayer 400. The Client Session Sublayer then returns the resource to the real client, namely, the requesting client browser. This completes the processing.

Many variants are within the scope of the present invention. Thus, for example, when a MEG within a group throws an exception to fail, a request execution controller may skip other MEGs in the same group. Also, the group administration functionality may be augmented to preconfigure group rules so that entire MEG groups can be skipped under given circumstances.

Thus, according to the present invention, software elements are grouped together with the output of the group cached for reuse. The grouping together of software elements is desirable to reduce the amount of cache space used while, at the same time, ensuring that the cache is not overburdened. The output of a given group is kept in cache and reused in future computations. A further illustration of the inventive concept is now described with respect to FIGS. 5–7.

Figure 5:
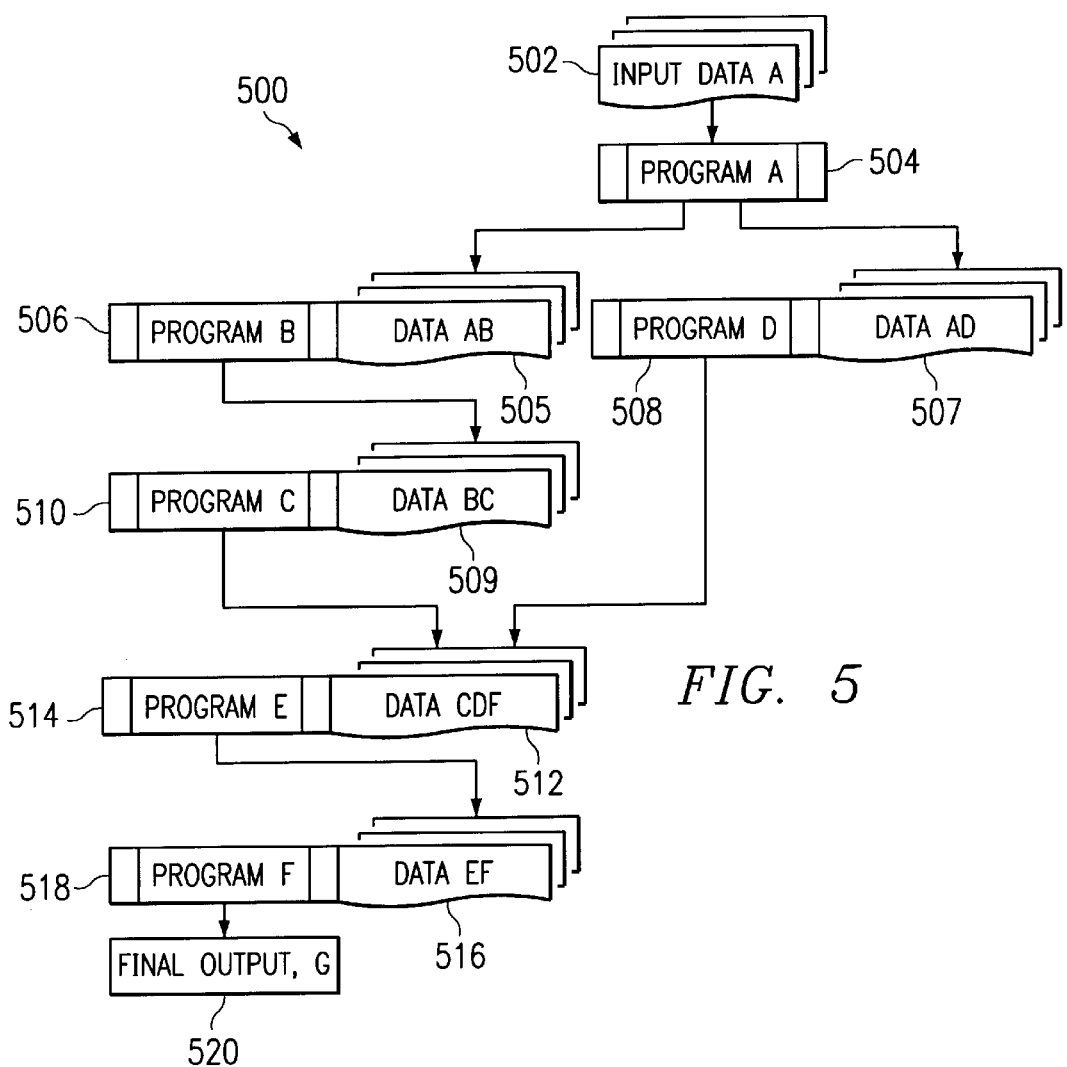
FIG. 5 is a block diagram of a complex software system illustrating a variety of programs that work in sequence and in parallel.

FIG. 5 illustrates a conventional complex software system 500. For purposes of illustration only, input data A 502 is the input to program A 504. Output G 520 is the final output of the system. Program A 504 generates input data AB 505 and input data AD 507 for program B 506 and program D 508, respectively. Program B 506 generates data BC 509 for program C 510. Program C 510 and program D 508 together contribute to the production of data CDF 512 as input to program E 514. Program E 514, in turn, generates data EF 516 for program F 518. Program F produces final output G 520.

Figure 6:
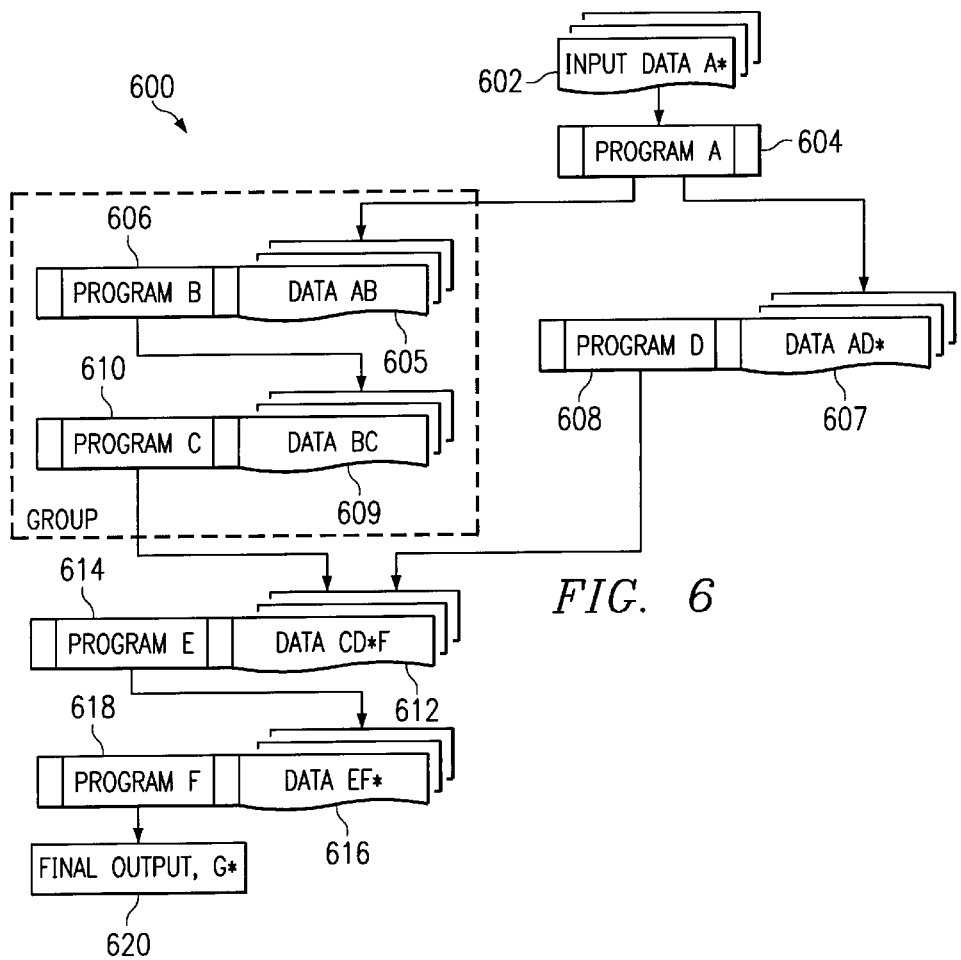
FIG. 6 illustrates how a group of program elements are aggregated together for reuse according to the present invention.

In many web-based scenarios, the Input Data 502 comprises two elements, a fixed element and a variable element. For example, the Input Data A may comprise web page data together with user preferences on how the web page data is to be transcoded for display (e.g., without images). Typically, the web page data is a fixed element and the user preferences are variable elements. FIG. 6 illustrates the computer system of FIG. 5 where another set of variable elements is used as initial input (600). For purposes of illustration only, input data A* 602 is the input to program A 604. Output G* 620 is the final output of the system.

Program A 604 generates input data AB 605 and input data AD* 607 for program B 606 and program D 608, respectively. Program B 606 generates data BC 609 for program C 610. Program C 610 and program D 610 together contribute to the production of data CD*F 612 as input to program E 614. Program E 614, in turn, generates data EF* 616 for program F 618. Program F produces final output G* 620.

As can be seen by comparing FIGS. 5–6, programs B and C are executed twice even though their input and output are the same across both operations. As has been described above, the present invention obviates such redundant execution of these program elements by grouping the elements together (as indicated by the dotted line in FIG. 6) and caching only the output of the entire group instead of the output of program B and the output of program C.

Figure 7:
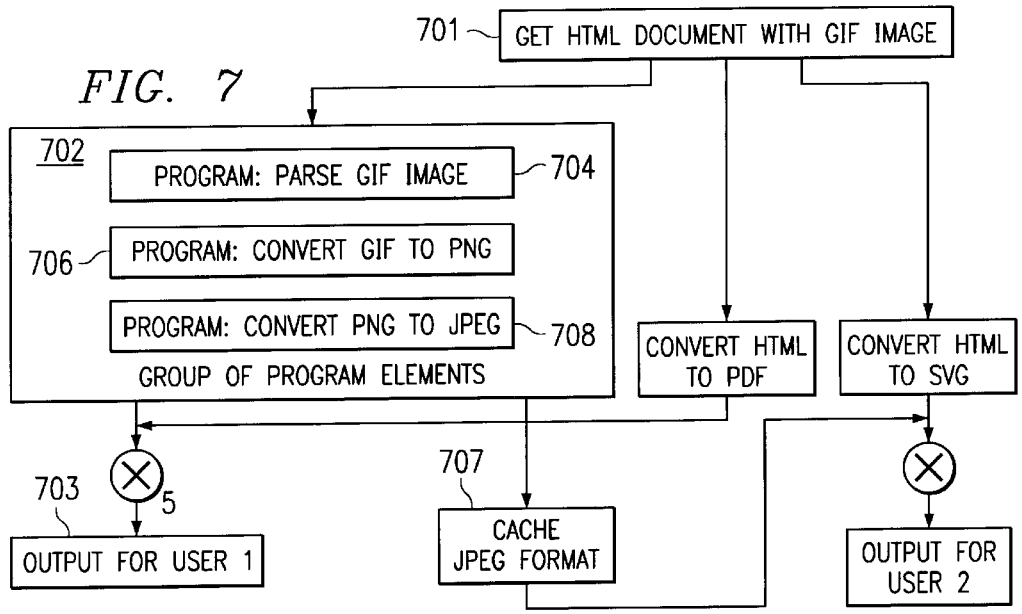
FIG. 7 illustrates another example of the principles of the present invention in the context of a web transcoding application.

FIG. 7 illustrates a more concrete example of the present invention. In this example, the input 701 is an HTML document with a gif image. In response to a first client request for this input, the output 703 returned to the first user is a PDF document with a jpeg image in place of the .gif image. In response to a second client request, the output 705 returned to the second user is a SVG document with the .jpeg image. In this example, the group 702 illustrates the elements that are aggregated together for caching purposes, preferably using the group administration functionality previously described. The group 702 comprises a first program element 704 that parses the .gif image, a second program element 706 that converts the .gif image to a .png format, and a third program element 708 that converts the .png image to a .jpeg format. Only the output 707 of the group (namely, the third program element 708) is cached and then reused to facilitate responses to the individual client requests.

As has been previously described, to support group administration, the MEGs used in the transcoder framework should have associated with them the following: a logical group name to which a MEG belongs, logical names of categories a MEG is dependent on, and (optionally) an indication that a MEG is never cached (either because it contains personalized data or has some other security implication). Preferably, MEG works in conjunction with the group administration mechanism. The MEG author should provide adequate documentation of the MEGs when he or she supplies plug-ins so that intelligent decisions can be made by the group administrator on classifying the MEGs.

The present invention provides numerous advantages over the prior art. With the present invention, a caching mechanism in a complex software system may be extended in a user-configurable manner by setting up optimal intermediate caching points that are defined by groups of programs used in long computations, thereby balancing space and time resources in the system. Preferably, MEGs are grouped according to whether or not the individual MEGs share a given relationship to one another. The particular relationship may be based on image formats, data formats, network, device or user preferences, or the like.

Intermediate caching of image transcoding according to the present invention increases system performance considerably. Suggested grouping of MEGs may include image groups whenever appropriate, as it is from the caching of images that significant performance advantages may be achieved during the operation of the transcoding framework. Typically, image data form a substantial portion of Web traffic (well over 50% and maybe as much as 70%) if size is the determining criterion. Thus, caching image groups and reusing them in transcoding according to the invention derives significant performance advantages.

The present invention may be used with third party "pull" caching solutions (e.g., Squid, WTE, and the like) so that users may take advantage of existing caching software. When used in the WBI framework, existing transcoders do not have to be modified to cause the final output of a group of such transcoders to occur. In effect, these caching points are added without overhead or expense by simply installing/configuring the new pluggable components on top of the "core" WBI codebase. Thus, transcoder developers that desire to use the caching design need not provide additional interfaces within their code to cause these caching points to occur. Instead, simple configuration via the administration panels and additional plug-in installation interfaces on top of well-known WBI plug-ins provide enough information to specify these caching points.

A given transcoder comprises software, i.e. a set of program instructions, executable in a processor. A representative processor is x86-, Pentium-, PowerPC®- or RISC-based, and that includes an associated operating system. A representative computing platform is an IBM S390 and AS400.

The present invention may be implemented in a conventional client-server computing environment. A given client machine and the server may communicate over the public Internet, an intranet, or any other computer network. If desired, given communications may take place over a secure connection. Thus, for example, a client may communication with the server using a network security protocol, such as Netscape's Secure Socket Layer (SSL) protocol or the like.

A representative client is a personal computer, notebook computer, Internet appliance or pervasive computing device (e.g., a PDA or palm computer) that is x86-, PowerPC®- or RISC-based. The client includes an operating system such as Microsoft Windows, Microsoft Windows CE or PalmOS. As noted above, the client includes a suite of Internet tools including a Web browser, such as Netscape Navigator or Microsoft Internet Explorer, that has a Java Virtual Machine (JVM) and support for application plug-ins or helper applications.

With reference to FIG. 1, a representative web server is an IBM Netfinity server comprising a RISC-based processor 121, a UNIX-based operating system 123 and a web server program 125. Suitable I/O 106 devices and routines are also provided to facilitate the administration functionality described above. Of course, any convenient server platform (e.g., Apache, WebSphere, or the like) may be supported. The server may include an application programming interface (API) 129 that provides extensions to enable application developers to extend and/or customize the core functionality thereof through software program including plug-ins, CGI programs, servlets, and the like.

The group administration mechanism of the present invention may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

One of ordinary skill in the art also will appreciate that the caching technique of the present invention may be generalized for use with any software system having a plurality of object-based program elements. Thus, the invention is not limited for use in a WBI framework having transcoders.

Having thus described our invention, what we claim as new and desire to secure by letters patent is set forth in the following claims.

What is claimed is:

1. A method of caching in a software system having a plurality of transcoders, comprising the steps of:
   associating into a group a set of related transcoders; and
   caching an aggregate output of the group only upon completion of the execution of all of the related transcoders.

2. The method as described in claim 1 wherein the software system is a web server having a transcoding service.

3. The method as described in claim 2 wherein a given transcoder is a request modifier.

4. The method as described in claim 2 wherein a given transcoder is a content editor.

5. The method as described in claim 2 wherein a given transcoder is a content generator.

6. The method as described in claim 1 wherein each of the related transcoders in the group process images.

7. The method as described in claim 1 wherein each of the related transcoders in the group process data.

8. The method as described in claim 1 wherein each of the related transcoders in the group share a given preference category.

9. The method as described in claim 1 wherein each of the related transcoders in the group share a given preference.

10. A method of caching in a software system having a plurality of transcoders, comprising the steps of:
    associating sets of transcoders into one or more groups;
    responsive to a first client request, selectively caching an aggregate output of all of the transcoders in the given group; and
    responsive to a second client request, using the aggregate output to generate a response to the second client request.

11. The method as described in claim 10 further including the step of:
    identifying a given priority for each of the one or more groups.

12. The method as described in claim 11 further including the step of:
    executing the one or more groups according to the given priority.

13. The method as described in claim 11 wherein at least one group includes a set of preference values.

14. A method of caching in a software system having a plurality of program elements, comprising the steps of:
    associating sets of program elements into one or more groups;
    responsive to a first client request, selectively caching an aggregate output of all of the program elements in the given group;
    responsive to a second client request, using the aggregate output to generate a response to the second client request; and
    identifying a given priority for each of the one or more groups,
    wherein at least one group includes a set of preference values; and
    wherein the preference values are selected from a set of values consisting of user preferences, network preferences and device preferences.

15. A method operative at a server, comprising the steps of:

in response to a client request, generating a URL that identifies a set of transcoder groups, wherein each transcoder group comprises a set of administrator-defined transcoders;

executing the transcoder groups to generate an output stream; and caching for subsequent reuse an output of a given intermediate transcoding step performed by one of the transcoder groups.

16. The method as described in claim 15 wherein the transcoder groups are executed according to a given priority.

17. The method as described in claim 16 wherein the given priority is user-defined.

18. The method as described in claim 15 wherein each of the transcoder groups has a set of preference values associated therewith.

19. The method as described in claim 18 wherein the set of preference values include a preference selected from a network preference, a user preference and a device preference.

20. A computer program product in a computer readable medium for setting up intermediate caching points in a software system having a plurality of transcoders, comprising:

means for associating sets of given transcoders into one or more groups;

means for prioritizing the groups for execution; and means for defining a set of preference values for each group.

21. A computer program product in a computer readable medium for caching data in a software system having a plurality of transcoders, comprising:

means for associating a set of related transcoders into a group;

means operative during the processing of a client request for caching for reuse and aggregate output of the set of related transcoders, wherein an individual output of at least one of the set of related transcoders in the group is not cached.

22. A computer system for providing a transcoding service, comprising:

a set of transcoders;

a cache; and a group administration mechanism for setting up intermediate caching points, comprising:

means for associating a set of related transcoders into a group; and means operative during the processing of a client request for storing in the cache for reuse an aggregate output of the set of related transcoders, wherein an individual output of at least one of the set of related transcoders in the group is not cached.

23. A computer system, comprising:

a set of transcoders;

a cache; and a group administration mechanism for setting up intermediate caching points, comprising:

display means for enabling a system administrator to associate a set of client requests for storing in the cache for reuse an aggregate output of the set of related transcoders.

24. A computer system, comprising:

a set of transcoders;

a cache; and a group administration mechanism for setting up intermediate caching points, comprising:

means for dynamically associating a set of related transcoders storing in the cache for reuse an aggregate output of the set of related transcoders.

* * * * *

UNITED STATES PATENT AND TRADEMARK OFFICE
CERTIFICATE OF CORRECTION

PATENT NO.     : 6,611,876 B1
DATED          : August 26, 2003
INVENTOR(S)    : Barrett et al.

It is certified that error appears in the above-identified patent and that said Letters Patent is hereby corrected as shown below:

Drawings,
Delete sheet 3 of 5, consisting of FIG 4A, and substitute therefor sheet 3 of 5 consisting of FIG 4A. (Attached)
Delete sheet 5 of 5, consisting of FIG 5 and 6, and susbtitute therefor sheet 5 of 5 consisting of FIG 5 and 6. (Attached)

Column 12,
Line 52, after "plurality of" delete "program elements" and insert -- transcoders --.
Line 53, after "sets of" delete "program elements" and insert -- transcoders --.
Line 56, after "all of the" delete "program elements" and insert -- transcoders --.

Signed and Sealed this

Twenty-second Day of February, 2005

JON W. DUDAS
*Director of the United States Patent and Trademark Office*